Oct. 23, 1962          J. M. TATONE          3,059,879
MODEL AIRCRAFT FUEL TANK AND ENGINE SUPPORT
Filed June 26, 1961
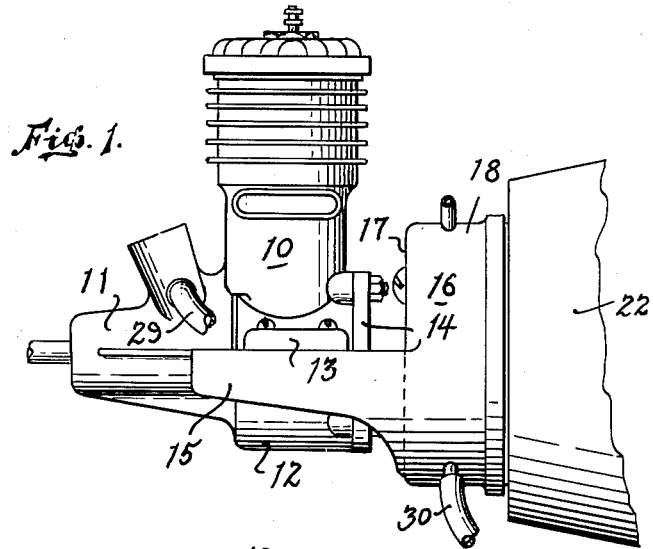
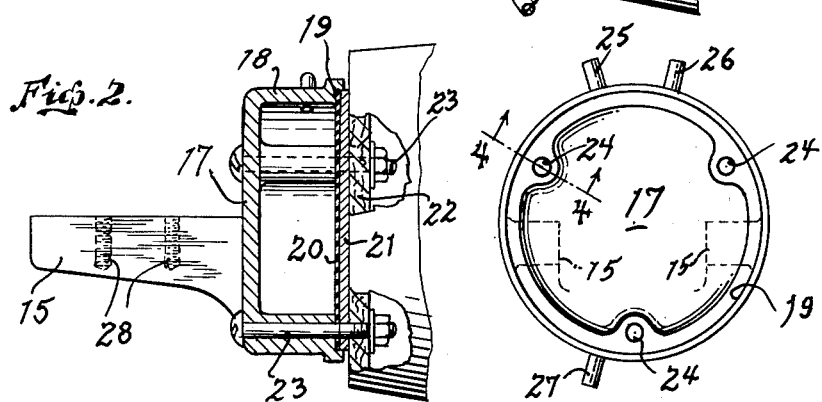
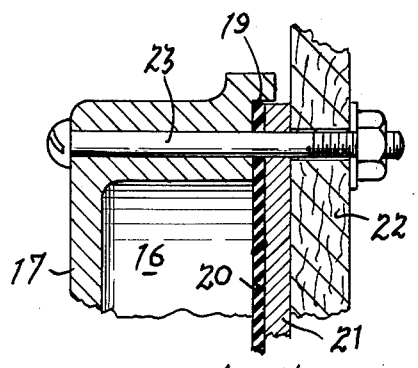
INVENTOR.
JOHN M. TATONE.
BY
*Wm H. Atkinson*
ATTORNEY

United States Patent Office 3,059,879
Patented Oct. 23, 1962

3,059,879
MODEL AIRCRAFT FUEL TANK AND
ENGINE SUPPORT
John M. Tatone, 1275 Geneva Ave., San Francisco, Calif.
Filed June 26, 1961, Ser. No. 119,680
6 Claims. (Cl. 244—54)

My present invention relates to model aircraft and more particularly to a combined fuel tank and engine mounting means.

An object of the invention is to provide a fuel tank having integrally cast engine mounting beams upon which the model engine with propeller is mounted in close proximity with its fuel supply and in a streamlined position with respect to the fuselage of the aircraft.

Another object of the invention is to provide a combined fuel tank and engine support by which an engine may be mounted in a practical and secure manner upon the firewall of an airplane fuselage in close proximity with its source of fuel and in which the fuel tank itself carries the conventional forwardly projecting engine supporting means.

Another object is to provide a support for model aircraft engines of standard construction by which the engine may be tilted easily for up or down or left or right thrust adjustments in a simple, practical and effective manner.

A further object of the invention is to provide a simple and compact unit which in addition to providing a means for mounting an engine upon the airplane also provides for the location of the fuel supply and timer control at a minimum distance from the engine and in which the engine is supported directly under the center of its piston travel.

Other objects and advantages will be in part evident to those skilled in the art and in part pointed out hereafter in connection with the accompanying drawing wherein it is shown by way of illustration and not of limitation a preferred embodiment of the invention.

In the accompanying drawing wherein like numerals refer to like parts throughout the several views:

FIGURE 1 is a side view showing my invention as installed upon an aircraft.

FIGURE 2 is a sectional view taken along the central vertical plane of the device as shown in FIGURE 1, FIGURE 3 is a rear view of the device with parts removed, and FIGURE 4 is an enlarged fragmentary section taken along one of the mounting screws.

The flying of model aircraft has developed into a very important competitive activity and while there are many manufacturers who sell fully equipped model airplanes the majority of the participants in this activity prefer to construct their own planes and as a result the requirements in many cases do not conform to any standard pattern. These model airplane flyers have to rely in the main on manufacturers for their engines. At the present time the major portion of the model engines manufactured for this purpose are equipped with mounting pads at the sides of the engine crankcase as this affords a convenient, effective means for securing the engine upon a horizontal supporting structure in a practical manner. In many cases the fuselage of the aircraft is built with forwardly and outwardly extending beams of hard wood that are built in as a part of the fuselage framing structure. In other cases supports having spaced projecting beams which may be attached as a unit to the firewall of a plane have been used but with these arrangements there still remains the problem of providing fuel for the engine which in most instances is solved by providing a fuel tank behind the firewall and within the fuselage. This of course requires the employment of relatively long fuel lines with the attendant possibility of damage where they must pass through or contact with portions of the fuselage. This condition is particularly aggravated by the fact that in many cases the fuel lines are subjected to excessive wear due to vibrations which are attendant upon the operation of the engine. Therefore in order to overcome these difficulties I have provided a novel arrangement in which the engine supporting beams and the fuel tank are constructed as a unitary mount which can be conveniently and effectively used as an engine mount on practically all types of planes, with the result that the fuel lines are shortened and the other difficulties formed by the employment of remotely located fuel tank as is now generally practiced are entirely overcome.

I am aware that fuel tanks have been proposed upon which an engine may be directly but with these devices the engine is secured so the support is at the rear end of the engine crankcase and out of line with the center of its piston travel. This form of mounting is sometimes employed on lightweight models but as the aircraft takes on larger engines these devices are not satisfactory. Therefore with the larger engines it is important to provide a support for the engine in alignment with the center of its piston travel; otherwise the engine tends to vibrate excessively. With my invention the engine is mounted upon supporting means directly in line with the center of its piston travel with the result that engine vibration is reduced to a minimum. A further advantage provided by my invention, as will be hereinafter pointed out, resides in the fact that the tank structure per se is such that its interior can be fully exposed for cleaning in a simple, convenient and effective manner. This is an important feature for in competition the contestants often dope up their fuel by mixing different combustible fluids which have a tendency to gum up and leave residues in the tank that might interfere with good performance of the engine and this is one of the problems which is difficult to control with fuel tanks of present conventional design.

For a better understanding of my invention, reference is now made to the accompanying drawing wherein the numeral 10 designates a conventional single cylinder model aircraft engine. This engine 10 has a forwardly extending propeller shaft mount 11 and a crankcase 12 upon the sides of which there are two oppositely extending pads 13 such as are provided on a majority of model engines for mounting upon so-called supporting beams and at its rear the crankcase 12 is closed by an end plate 14. With this form of mounting the engine 10 can be completely removed as an operating unit from its support which in accordance with my invention consists of two laterally spaced beams 15 that are formed as an integral part of a fuel tank 16. The fuel tank 16 has a front wall 17 and in the case of a cylindrical tank, a rearwardly extending flange 18 or rearwardly extending walls where the tank may take on a different configuration. At the inner end of the flange 18 there is a sealing disc seat 19 which, as shown in FIGURES 2 and 4 of the drawings, is adapted to accommodate a sealing disc 20 of non-metallic compressible material and outwardly from this disc there is a pressure disc or plate 21 of a thickness that will extend its outer surface beyond the outer limits of the disc sealing seat 19 so that when the tank 16 with the sealing disc 20 and pressure plate 21 are secured to the firewall or bulkhead of an aircraft structure 22 by screws 23 the fuel tank will be completed. During this operation the sealing disc 20 will be tightly compressed and at the same time the screws 23 will perform the dual function of completing and sealing of the tank and also securing the tank and engine firmly to the aircraft structure without other securing means.

As shown in FIGURE 3 of the drawing the tank is provided with three equally spaced holes 24 through which the screws 23 are projected and the recess 19 is continued out around these screw openings 24 so that the sealing discs 20 when pressed thereagainst will completely seal off the open rear side of the tank. In accordance with conventional practice the tank 16 is also equipped with an extending filler tube 25, a breather tube 26 and a fuel outlet tube 27. With two of the screws 23 located in laterally spaced relation at the upper part of the tank 17, it will be possible to tilt the supporting beams 15 to one or the other side of the vertical axis of the aircraft to compensate for side thrust in either direction. Likewise, any up and down thrust which may be present might be compensated for by inserting a shim or washer between each of the two upper screws and the aircraft bulkhead or a single washer or shim can be inserted around the lower tank secure screw 23. With the laterally spaced engine supporting beams 15 formed as an integral part of the fuel tank 16, the pads 13 of the engine may be firmly secured thereupon by providing tapped holes 28 into which securing screws passing through the pads 13 may be threaded.

In FIGURE 1 of the drawing the engine 10 is shown as having portions of its intake tube 29 and the tank outlet tube 30 inclined rearwardly as would be the case should this mounting be used in connection with a conventional fuel flow timer mounted in exposed position against an outer wall of the aircraft fuselage. However should the engine be used in the manner herein indicated without a fuel flow timer, the fuel line would consist of a single tube extending from the outlet tube 27 of the tank 16 directly to the intake port of the engine 10.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. A combined fuel tank and engine mounting for model aircraft, comprising a tank forming member having a solid forward wall with rearwardly extending contiguous portions forming a cup-like receptacle with an open rear side conforming substantially to the dimensions of said forward wall, said rearwardly extending contiguous portions having a recessed sealing gasket seat extending therearound, a sealing gasket completely covering the open rear side of said member seated at its perimeter in said recess, a pressure plate conforming with the outline of said sealing gasket of a thickness extending outwardly beyond the depth of the recessed gasket seat in the rearwardly extending portion of said member, a plurality of mounting screws extending through the forward wall of said member, said gasket and said pressure plate for securing said tank forming member at the front of a model aircraft fuselage, and a pair of laterally spaced engine supporting beams formed as an integral part of said tank forming member and extending outwardly from the forward wall thereof, whereby said tank forming member and said engine supporting beams may be secured as a unit upon the fuselage of an aircraft by said mounting screws.

2. A combined fuel tank and engine mounting for model aircraft, comprising a tank forming member having a solid forward wall with a rearwardly extending annular flange forming an open cuplike receptacle, said annular flange having a recessed sealing disc seat extending therearound, a sealing disc of compressible material completely covering the opening of said receptacle and seated at its perimeter in said recess, a metallic pressure plate conforming with the outline of said sealing disc centered in said recessed sealing disc seat in the rearwardly extending annular flange of said tank forming member, a plurality of mounting bolts extending through said forward wall, said gasket and said pressure plate for securing said fuel tank so formed upon the front of a model aircraft structure, and a pair of laterally spaced forwardly extending engine supporting beams formed as an integral part of said tank forming member.

3. A combined fuel tank and engine mounting means, comprising a tank forming member having a solid forward wall with rearwardly extending contiguous portions forming a cuplike receptacle with an open rear side conforming substantially to the dimensions of said forward wall, and a pair of horizontally spaced engine supporting beams extending from the forward wall and formed as an integral part of said tank forming member, the rearwardly extending portion of said forward wall being provided with a recessed sealing disc seat, a compressible non-metallic sealing disc seated in said recess, a metallic pressure plate conforming with the outline of said sealing disc and of a thickness extending outwardly beyond the depth of said sealing disc seat, and a plurality of mounting screws extending through said forward wall, said gasket and said pressure plate as the sole means for compressing said sealing disc and securing said engine supporting beams and said tank forming member to the front firewall of an airplane fuselage.

4. In a unitary model aircraft engine support and fuel tank, the combination of a tank forming member of cuplike configuration having a vertical forward wall, a pair of spaced horizontally extending engine supporting beams cast as an integral part of the forward wall of said tank forming member between which an engine is supported, said tank forming member being completely open at its rear vertical side and having a sealing disc accommodating recess extending therearound, a sealing disc of compressible material seated in said recess, a pressure plate corresponding in diameter to said sealing disc having a thickness greater than the depth of the said sealing disc accommodating recess, and threaded means extending through the front wall of said tank forming member and through said sealing disc and said pressure plate to the fuselage of the aircraft for securing said tank forming member to the aircraft fuselage, whereby said tank forming member may be firmly secured to the aircraft as a support for an engine and the cup-like portion thereof will be sealed to form a fuel tank when finally secured to the aircraft fuselage by said threaded means.

5. A combined fuel tank and engine support for model aircraft, comprising a tank forming member having a solid forward wall and with rearwardly extending contiguous portions forming a fuel receptacle with an open rear side conforming substantially with the dimensions of said forward wall, means forming a closure for the open rear side of said tank forming member when secured to the fire wall of a model aircraft, and a pair of laterally spaced and longitudinally extending beams extending outwardly and formed as an integral part of said tank forming member, whereby when secured to the fire wall of a model aircraft said beams will provide a support upon which a model aircraft engine may be secured in operative relation with the fuselage of model aircraft.

6. A combined fuel tank and engine support for model aircraft, comprising a tank forming member having a solid forward wall and with rearwardly extending contiguous portions forming a fuel receptacle with an open rear side, means forming a closure for the open rear side of said tank forming member when secured to the fire wall of a model aircraft, and characterized by the fact that the forward wall of said tank forming member has a pair of laterally spaced longitudinally extending engine supporting beams formed as an integral part of said tank forming member, whereby when secured to the fire wall of a model aircraft said beams will provide a support upon which a model aircraft engine may be secured in operative relation upon the fuselage of a model aircraft by said tank forming member.

References Cited in the file of this patent

UNITED STATES PATENTS

| | | |
|---|---|---|
| 2,412,719 | Dausmann | Dec. 17, 1946 |
| 2,788,064 | Van De Walker | Apr. 9, 1957 |